Patented Dec. 5, 1922.

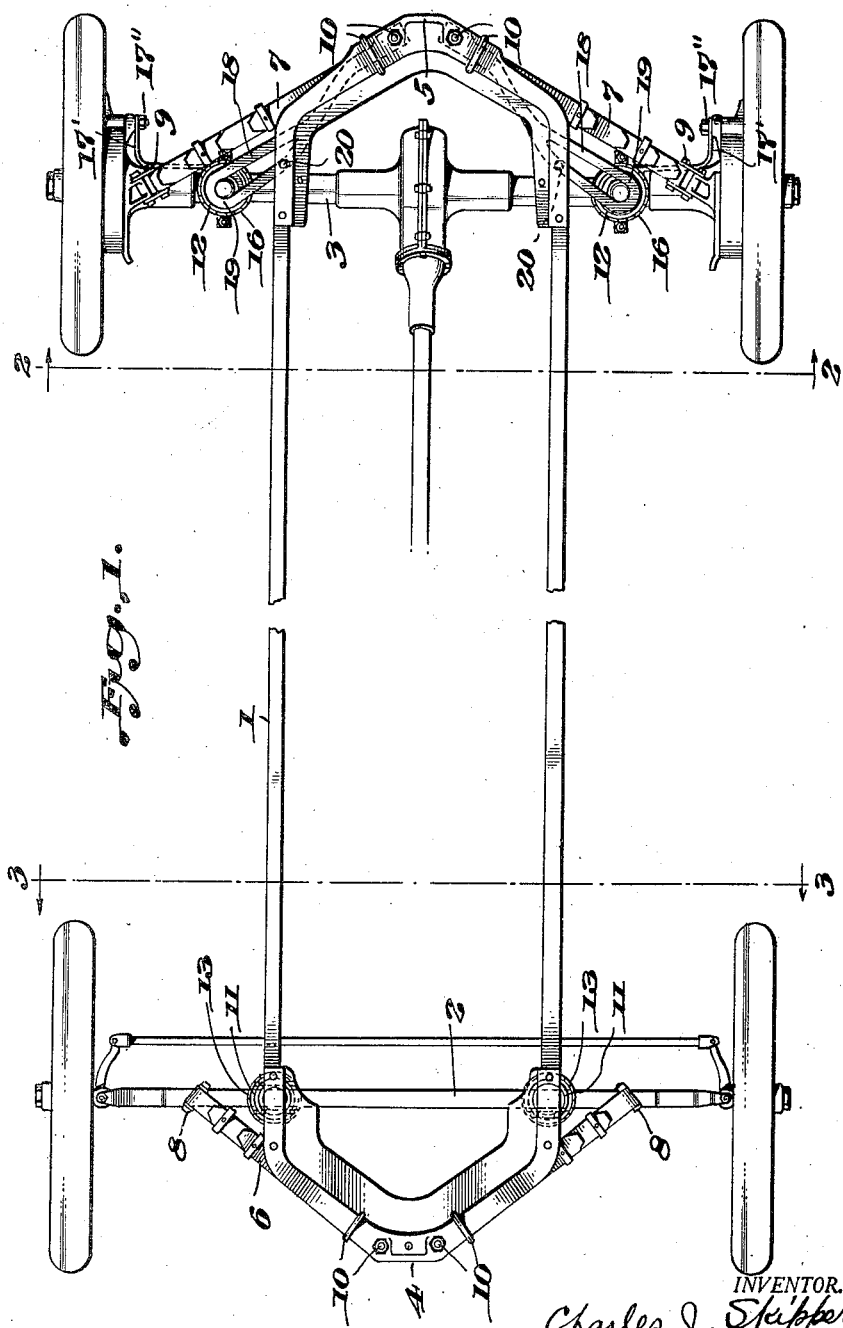

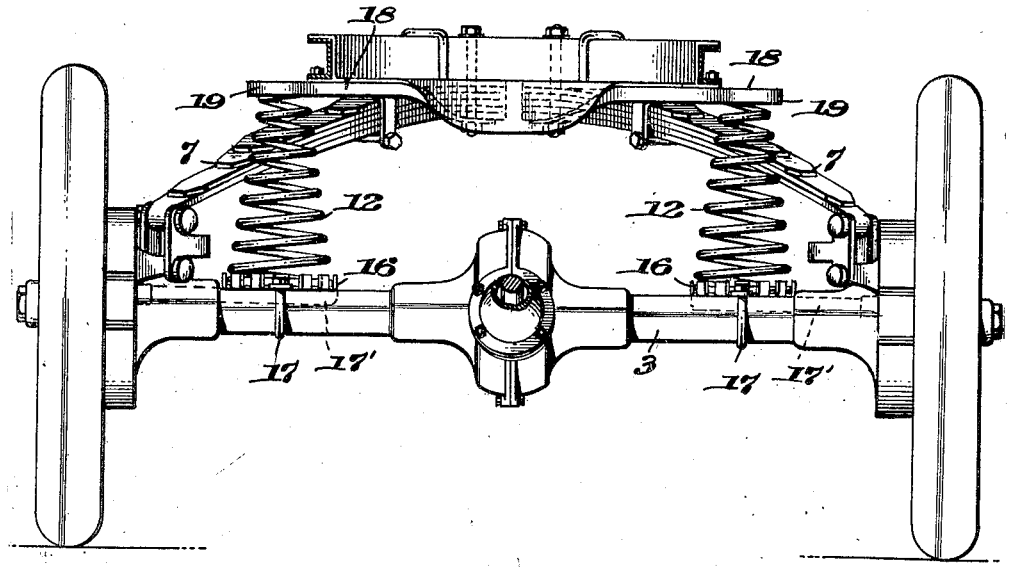
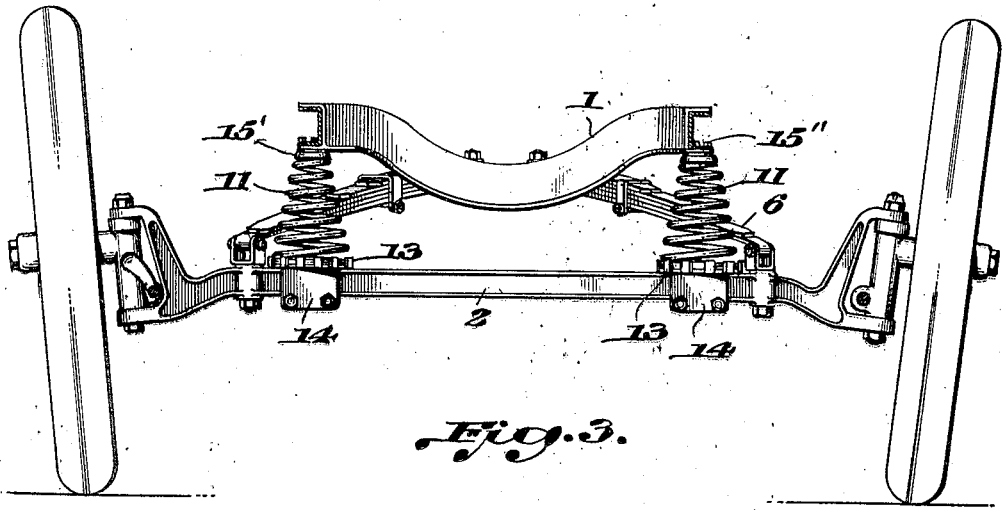

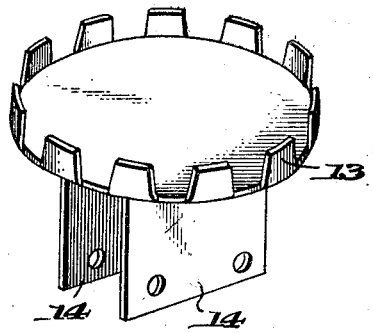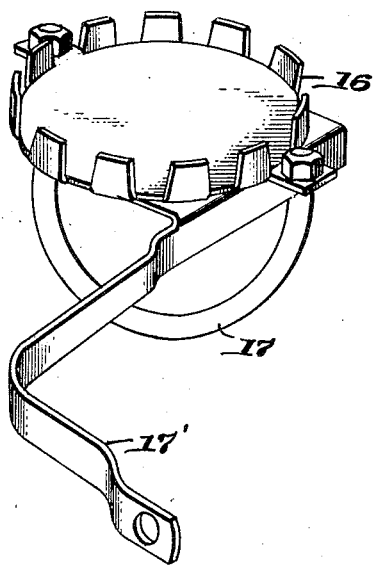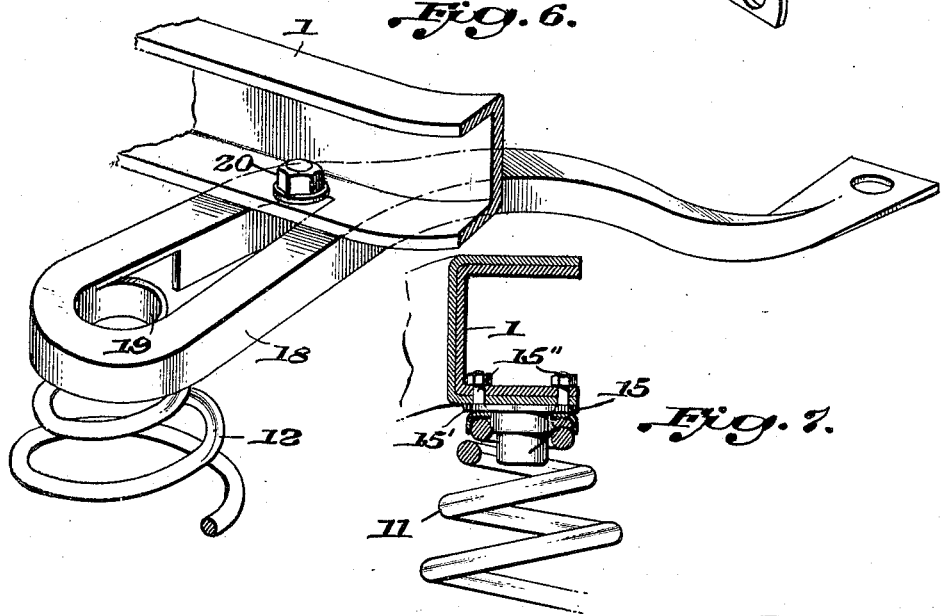

1,437,688

UNITED STATES PATENT OFFICE.

CHARLES J. SKIPPER, OF PROVIDENCE, KENTUCKY.

VEHICLE SPRING.

Application filed September 7, 1921. Serial No. 499,084.

*To all whom it may concern:*

Be it known that I, CHARLES J. SKIPPER, a citizen of the United States, residing at Providence, in the county of Webster and State of Kentucky, have invented certain new and useful Improvements in Vehicle Springs, of which the following is a specification.

This invention relates to vehicle springs and, more particularly, to a system of auxiliary springs used in combination with the well known three-point suspension springs of the Overland automobile.

The Overland car having the well known three-point suspension does not ride easily when it has a light load. When the car has no load, the weight of the frame and bed depresses the three-point suspension springs about one and one-half inches from the position they would assume if they had no bed and frame to support. This depression in an unloaded automobile represents that part of the flexibility of the springs required to make the car ride easier with either a light load or a heavy load.

My object is to provide auxiliary springs so arranged and combined with the three-point suspension springs ordinarily used in the Overland car that additional initial resiliency is provided which will overcome the defect hereinbefore mentioned and take care of a light load and will, further, relieve the three-point suspension springs of the load when the car is heavily loaded until a rough place is struck by the car, whereupon the three-point suspension springs will function in the manner claimed for them by the manufacturers of the Overland car.

Briefly stated, my auxiliary springs are so arranged and combined with the three-point suspension springs that the latter are relieved of the load up to a certain point and at that point the first or initial resiliency of the three-point suspension springs is allowed to function at its maximum efficiency, whereas, without the use of my improvements, the first, or initial, resiliency of the three-point suspension springs is merely taken up by the weight of the empty bed and frame.

My auxiliary springs raise the bed of the car up about one and one-half inches higher than the level it now assumes in the Overland car, thereby relieving the usual three-point suspension springs of all weight when the car is empty and supporting a light load up to the point where the load is jointly carried by my auxiliary springs and three-point suspension springs.

The auxiliary springs become tightly compressed and offer more resistance from the point where the three-point suspension springs assume the load and these auxiliary springs act as a counterbalance to the three-point suspension springs, whereby the car rides easier when either lightly loaded or heavily loaded, than would be the case if the auxiliary springs were not used.

I have described and shown an embodiment of my invention such as will illustrate the principle thereof but I wish it to be understood that the invention is not limited to the precise constructions and exact relative arrangements of the auxiliary springs and three-point suspension springs shown and described, as it is possible that changes may be resorted to without departing from the essential principle involved.

In the accompanying drawings:

Figure 1 is a plan view, parts of the bed being broken away, illustrating my invention applied to the well known three-point spring suspension of an Overland car;

Fig. 2 is a vertical section on line 2—2, Fig. 1;

Fig. 3 is a vertical section on line 3—3, Fig. 1;

Fig. 4 is a perspective of one of the lower cups for the front springs;

Fig. 5 is a similar view of one of the lower cups for the rear springs, its arm, and clip;

Fig. 6 is a similar view of one of the arms for the rear springs, illustrating how it is fastened to the bed; and Fig. 7 is a detail section showing how the tops of the front springs are connected to the bed.

The bed 1 of the Overland car is extended, as is well known, beyond the front and rear axles 2, 3, as shown at 4 and 5.

The three-point suspension is at each end of the car and is represented by the springs 6, 7, connected to the respective axles at 8, 9, and to the bed by the bolts and shackles or clips 10. The suspension or support of the bed 1 being well beyond the front and rear axles, the effect is that of a relatively long spring base in a car which is only of a moderate length of wheel base. Thus, in the Overland car, easy riding qualities are obtained such as are usually only found in cars of longer wheel base.

As previously explained, however, the normal weight of the bed absorbs the initial resiliency of the springs 6, 7, and depresses them about one and one-half inches from what would be their expanded position if they carried no load. This absorption of initial resiliency is what the Overland car needs to be eliminated in order that it may ride easier with either a light load or a heavy load.

According to my invention, the weight of the bed 1 and body supported thereby is taken off of the springs 6, 7, by the employment of expansion helical springs of which one set 11 supports the forward part of the bed 1 and the other set 12 the rear part thereof. I do not limit the invention to the exact manner of applying these springs nor to their precise position but their purpose is to support the bed 1 from the axles 2 and 3, in fact, to hold the bed in raised position and relieve the springs 6 and 7 of the initial one and one-half inches of compression hereinbefore referred to. The springs 11, 12, support the load up to that point where the three-point suspension springs 6 and 7 take hold whereupon the load is supported jointly by springs 6 and 7 and springs 11 and 12. The springs 11 and 12 act as a counterbalance for the springs 6 and 7.

The front set of auxiliary springs 11 are seated in cups 13 (Fig. 4) which are provided with plates 14 clamped to the front axle 2. The upper end of the springs are received within inverted washer-cups 15' which surround the ordinary rubber bumpers 15 (Fig. 7) and are fastened to bed 1 by bolts 15''. Springs 11 should be placed as far over toward the steering wheels as possible and yet have proper supporting effect on the bed 1.

The springs 12 are supported in cups 16 (Fig. 5) which are connected to the rear axle by clips or shackles 17 and should be located as far over toward the rear wheels as possible. The cups have angle arms 17' which are bolted to the brake drums at 17'' (Fig. 1). The supporting effect of the bed 1 from springs 12 is effected through the medium of arms 18 (Fig. 6) which have cups or sockets 19 receiving the upper ends of the springs 12. The arms 18 are bolted to the bed at 20 and are held by the bolts and shackles 10.

I claim:

1. In a vehicle, the combination with the axles, and the frame thereof, of three-point suspension main springs supporting the frame from the axles, of expanded auxiliary springs interposed between the axles and the frame and normally holding the frame sufficiently elevated to relieve the three-point suspension main springs of the load which would otherwise be supported by them, said auxiliary springs thereby enabling the initial resiliency of the three-point suspension main springs to be utilized.

2. In a vehicle, the combination with the axles, the frame, and three-point suspension main springs supporting the frame from the axles, of expanded auxiliary coil springs mounted on the front axle and supporting the front end of the bed, auxiliary coil springs mounted on the rear axle, and arms connected to the rear part of the frame which rest upon the last named auxiliary coil springs, said auxiliary springs normally holding the frame sufficiently elevated to relieve the three-point suspension springs of the load which would otherwise be supported by them, said auxiliary springs thereby enabling the initial resiliency of the three-point suspension main springs to be utilized.

In testimony whereof I affix my signature.

CHARLES J. SKIPPER.